US008279071B2

(12) United States Patent
Cavanaugh (10) Patent No.: US 8,279,071 B2
(45) Date of Patent: *Oct. 2, 2012

(54) REAL-TIME EVENT NOTIFICATION (75) Inventor: Craig Cavanaugh, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/015,036

(22) Filed: Jan. 27, 2011

(65) Prior Publication Data

US 2011/0121966 A1  May 26, 2011

Related U.S. Application Data (63) Continuation of application No. 11/831,270, filed on Jul. 31, 2007, now Pat. No. 7,898,423.

(51) Int. Cl.
*G08B 23/00* (2006.01)

(52) U.S. Cl. ............. 340/573.1; 340/539.13; 455/404.2; 455/412.2; 455/456.1

(58) Field of Classification Search ............... 340/573.1, 340/573.4, 539.11–539.13, 572.1–572.9, 340/10.1–10.6; 379/37, 38, 51; 455/404.1, 455/404.2, 412.1, 412.2, 456.1, 456.3
See application file for complete search history.

(56) References Cited

U.S. PATENT DOCUMENTS

| 6,169,498 | B1 * | 1/2001 | King et al. ............... 340/539.13 |
| 6,243,039 | B1 | 6/2001 | Elliot |
| 6,657,543 | B1 * | 12/2003 | Chung ....................... 340/573.1 |
| 6,847,892 | B2 | 1/2005 | Zhou et al. |
| 6,920,328 | B2 | 7/2005 | Wollrab |
| 6,968,179 | B1 | 11/2005 | De Vries |
| 6,998,985 | B2 * | 2/2006 | Reisman et al. ........... 340/573.1 |
| 7,301,463 | B1 | 11/2007 | Paterno |
| 7,366,522 | B2 | 4/2008 | Thomas |
| 7,576,644 | B2 * | 8/2009 | Hart ......................... 340/539.13 |
| 2003/0006912 | A1 * | 1/2003 | Brescia ...................... 340/573.1 |
| 2006/0230037 | A1 | 10/2006 | Sugiyama et al. |
| 2007/0188331 | A1 | 8/2007 | Kumagai et al. |
| 2008/0306759 | A1 | 12/2008 | Ilkin et al. |

OTHER PUBLICATIONS

Non-Final Official Action dated Sep. 30, 2009 in U.S. Appl. No. 11/831,270.
Final Official Action dated Mar. 9, 2010 in U.S. Appl. No. 11/831,270.
Notice of Allowance dated Oct. 28, 2011 in U.S. Appl. No. 11/831,270.

* cited by examiner

*Primary Examiner* — Thomas Mullen
(74) *Attorney, Agent, or Firm* — Hope Baldauff Hartman, LLC (57) ABSTRACT

Methods, systems, and computer-readable media provide for the real-time notification of user events. According to various embodiments described herein, a user initiates a notification process in which the geographic location of a device associated with the user, as well as any desired activity data, is generated into a real-time notification for another party. The location of the user device is determined upon the initiation of the notification process. Original or pre-programmed messages may be posted on a website or delivered along with the location of the user device to any number of communication devices. The various embodiments provide an efficient manner of updating selected individuals with the location of a user and of providing those individuals with desired information.

20 Claims, 5 Drawing Sheets

REAL-TIME EVENT NOTIFICATION

CROSS REFERENCE TO RELATED APPLICATIONS

This patent application is a continuation of and claims priority to application Ser. No. 11/831,270, now U.S. Pat. No. 7,898,423 entitled "Real-Time Event Notification," filed Jul. 31, 2007, which is incorporated herein by reference in its entirety.

TECHNICAL FIELD

This application relates generally to the field of communications. More particularly, this application relates to detecting the location of a user during an event instance and providing a notification that the event occurred at the detected location.

BACKGROUND

With the increasing use of mobile telephones and other communications technologies, many people like to keep in touch with friends, family members, or loved ones at all times and places. In doing so, it is often useful for a person to know the real-time location and/or activity of another party. Similarly, many people like to communicate their location and/or activity to other people. As an example, a husband or wife might like to know whether their spouse has left work or not, and if so, where the spouse is currently located in the commute home. Another person might want to let a friend know that they just caught a large fish at a particular fishing location. To communicate with another person, either to determine the other person's location and activity or to notify the other person of an activity at a location, a person will typically use a cellular or wireline telephone. The communication commonly includes dialing a telephone number, waiting for a communication link to be established, and having a conversation. To communicate with multiple people, multiple telephone calls must be made.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer-readable media are provided herein for providing real-time event notification. According to embodiments described herein, user event data is received and used in determining a geographic location of a user device. A notification that includes the geographic location of the user device is generated and provided according to a notification rule. According to various embodiments, the user event data may include an identifier of the user device and location data that corresponds to the geographic location of the user device. The notification may include activity data corresponding to user-defined information. According to further embodiments, the notification rule includes an instruction to provide the notification according to user-defined criteria stored within a user profile.

Other apparatus, systems, methods, and/or computer program products according to embodiments will be or become apparent to one with skill in the art upon review of the following drawings and Detailed Description. It is intended that all such additional apparatus, systems, methods, and/or computer program products be included within this description, be within the scope of the present invention, and be protected by the accompanying claims.

DETAILED DESCRIPTION

The following detailed description is directed to methods, systems, and computer-readable media for providing real-time event notification. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein may be practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

As discussed briefly above, people are often using a cellular telephone or other communications device while driving, walking, flying in an airplane, or while sitting at home. Many conversations are unnecessary and even dangerous given the environment in which a conversation may take place. For example, a calling party may place a call to a spouse at home to inform the spouse that they are on the way home and where they are currently located in order to estimate an accurate arrival time. At other times, placing a telephone call may be inconvenient. As an example, a fisherman may wish to inform a friend and fellow fisherman that a large fish was just caught in a favorite fishing location. Placing a telephone call to the friend would not only waste valuable fishing time but may also disturb an otherwise quiet and peaceful environment.

Figure 1:
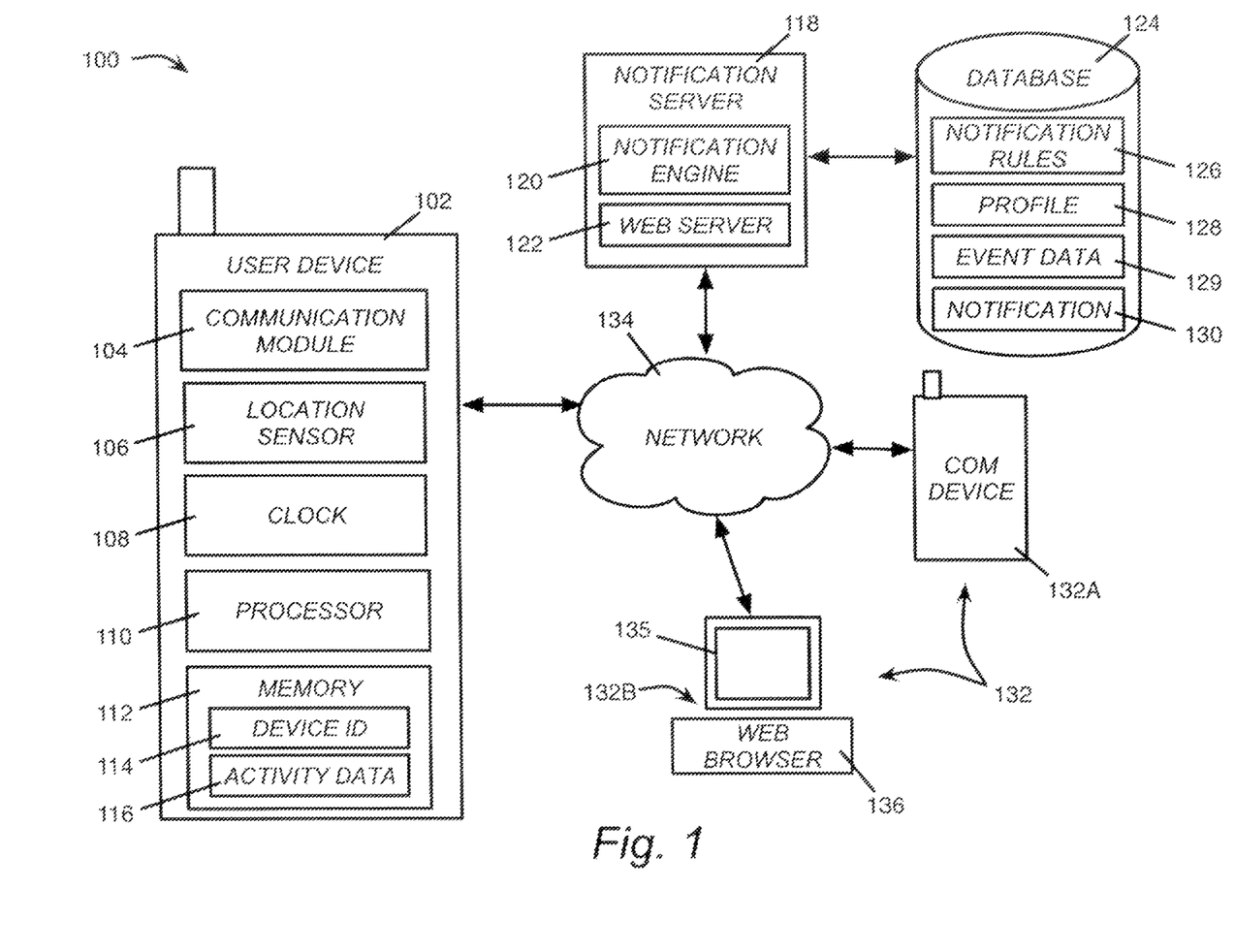
FIG. 1 is a block diagram showing elements of an illustrative communication system according to various embodiments presented herein.

According to embodiments provided herein, a user may notify one or more parties of their current geographic location, and provide a message or other data, in an efficient manner. As will be described below, embodiments provide for a portable user device that is capable of detecting the location of the device and providing that information, along with information regarding the activity of the user or any other type of message or data provided by the user, to any number of recipients. The information is provided via a website, electronic mail (email), text messaging, recorded announcement, or any other type of notification method. In the following detailed description, references are made to the accompanying drawings that form a part hereof, and that show, by way of illustration, specific embodiments or examples. Referring now to the drawings, in which like numerals represent like elements through the several figures, aspects of a real-time event notification system will be described. FIG. 1 shows various elements of a real-time event notification system 100 according to embodiments described herein. The real-time event notification system 100 includes a user device 102, a notification server 118, a database 124, and communication devices 132.

It should be understood that the user device 102 and the communication devices 132 may each be any type of communication device, including but not limited to a personal computer, a cellular telephone, a personal data assistant, a television, a set-top television box, Internet Protocol Television (IPTV), a digital video recorder, a music or other audio device, a video game console, or any other communications device capable of transmitting and/or receiving data via a network 134. According to one embodiment, the user device 102 is a cellular telephone and communication devices 132 include a cellular telephone 132A and a personal computer 132B. The personal computer 132B has a display 135 for viewing notifications from the user device 102 and is shown to include a web browser 136 for accessing data on a website hosted by a web server 122. The cellular telephone 132A, as well as any other type of communication device 132, may also include the web browser 136.

The elements of the real-time event notification system 100 communicate with one another via the network 134. It should be understood that the network 134 may include a wireless network such as, but not limited to, a Wireless Local Area Network (WLAN) such as a WI-FI network, a Wireless Wide Area Network (WWAN), a Wireless Personal Area Network (WPAN) such as BLUETOOTH, a Wireless Metropolitan Area Network (WMAN) such as WiMAX network, a cellular network, or a satellite network. The network 134 may also be a wired network such as, but not limited to, a wired Wide Area Network (WAN), a wired Local Area Network (LAN) such as the Ethernet, a wired Personal Area Network (PAN), or a wired Metropolitan Area Network (MAN). The network 134 may also include the Internet such that the network communications occur via wireless or wired connections to the Internet.

The user device 102 includes a communication module 104 that provides the communications capabilities of the user device 102. The communication module 104 may include any number and type of hardware and software components that are operable to allow the user device to communicate voice and data over the network 134 to other elements of the real-time event notification system 100, including but not limited to components that allow for voice calls, email, text messaging, and media transmission. The user device 102 may additionally contain a location sensor 106. The location sensor 106 is operative to determine the geographic location of the user device 102 at any given time. According to one embodiment, the location sensor 106 is a Global Positioning System (GPS) receiver. According to another embodiment, the location sensor 106 may include components that are operative to detect the proximity of the user device 102 to a known, fixed object to determine the location of the user device 102. An example would be a receiver within the user device 102 that could detect a low-range signal emitted from a transmitter located within a building at known geographic coordinates. Location determination will be discussed in greater detail below with respect to FIG. 2.

The user device 102 may additionally include a clock element 108 that is operative to time stamp an event. As will be described further below, when the user initiates an event notification, the time of the event may be recorded using the clock element 108 and transmitted with the event data to be included in the event notification. The user device further includes a processor 110 and memory 112 for executing the processes described herein. The memory may include a device identification (ID) 114 that identifies the user device so that the notification server 118 is able to ensure that incoming event data is used to notify the correct communication devices 132, as will be discussed below.

The memory 112 may also contain activity data 116. The activity data 116 may include any information to be used in the notification excluding the device ID 114, time stamp, and location data. For example, the user may want to send a message to a friend. The message from the user will be transmitted as activity data 116 with the device ID 114 and location data from the location sensor 106 to be included in the subsequent notification. The message may be typed into the user device 102 using a keyboard or other user input device associated with the user device 102. Alternatively, the message may be pre-programmed into the memory 112 and associated with a particular key or series of key presses. In this manner, the user may press a single button or series of buttons on the user device 102 to attach a pre-programmed message "driving to work" as activity data 116 to be included in the notification.

It should be understood that the activity data 116 does not have to be in a format that is ready for inclusion within the notification. For example, the user may press a single button or series of buttons on the user device 102 as user input that correspond to the message "driving to work" as in the example above. However, instead of the user device 102 performing a look-up and attaching the located message as activity data 116 to be sent to the notification server 118, the button press data representing the user input is transmitted as activity data 116 to the notification server 118, where messages corresponding to any number of user input combinations are stored. The message look-up would then occur at the notification server 118. The activity data 116 may include any type of data, including but not limited to text, audio, video, images, and any other type of media. This is useful when a user would like to quickly post a picture to a notification website. The picture can be easily posted with an exact location and time stamp.

A notification engine 120 residing on the notification server 118 receives event data 129 from the user device 102 via the network 134. For the purposes of this disclosure, event data 129 includes all data transmitted from the user device 102 to be used in the creation of an event notification 130. In the example discussed above, the event data 129 may include the device ID 114, a time stamp, location data from the location sensor 106, and the message "driving to work" or corresponding user input as activity data 116. It should be appreciated that the notification engine 120 may be any software application or programmable hardware operative according to the embodiments described herein.

The notification server 118 is communicatively linked to the database 124 via a direct or remote connection. The database 124 is used to store notification rules 126, user profiles 128, event data 129, and notifications 130. Alternatively, the notification rules 126, user profiles 128, event data 129, and notifications 130 may be stored within memory or other mass storage device located within the notification server 118. The notification rules 126 provide the notification engine 120 with instructions as to who to notify, when they should be notified, and how a notification is to be distributed. For example, a user may want to notify a specific person as to his location and activity at any given time. The user may specify in a notification rule 126 that person A is to be notified by text message on the cellular telephone 132A each time event data 129 is received. Alternatively, the user may want to establish more complex notification rules 126 so that person A is notified by email when the user is at location X, and persons B, C, and D are notified by text message when the user is at location Y.

According to one embodiment, the notification rules 126 specify that the notification 130 be posted to a website hosted by the web server 122. It should be appreciated that the website may be a public website on the Internet that is available to anyone who navigates to the appropriate Uniform Resource Locator (URL) using a web browser 136, or may be on a private extranet that is available to a select group of individuals. For example, a user may establish the notification rule 126 that instructs the notification engine 120 to post the notification 130 on a MYSPACE.COM website that is viewable by family and friends whenever event data 129 is received. According to another embodiment, family websites may be created for the purpose of keeping track of the location and activities of family members. In this embodiment, a parent returning home from work may log into the family website and obtain real-time information as to the locations and activities of her children and spouse without having to call each family member to determine their locations.

In another embodiment, a user may be a member or subscriber to a certain type of community website targeted at a particular sport, hobby, or interest. For example, using the implementations described herein, subscribers to a fishing website may have access to real-time information as to how well, and where, fish are being caught within a geographic area. Whenever a fisherman catches a fish, he or she can press a pre-programmed button or series of pre-programmed buttons on the user device 102 to identify the type and size of fish. The location of the user device 102 will be determined by the location sensor 106, the data will be time stamped, and the user's input regarding the type and size of fish will be combined with the location and time to create event data 129 that is transmitted to the notification engine 120. The notification engine 120 will create the notification 130 and publish the notification 130 on the fishing website according to the notification rule 126. In this manner, a subscriber to the fishing website can instantly see that John Doe, associated with the device ID 114, just caught a five pound bass at a precise location at Lake Hartwell. A detailed example of the real-time event notification process will be discussed below with respect to FIG. 2.

Additionally, embodiments provided herein allow for the current location of the user device 102 to be compared to a list of locations stored within the user profile 128 or within the memory 112 of the user device 102. If the current location is within a predetermined distance from a stored location, then the notification 130 may be sent to the appropriate communication devices 132 according to the notification rule 126. This embodiment is useful when a user would like to notify certain people when he or she gets close to a particular location or when a user would like to be notified when another user gets close to specific locations. An example would be when a parent would like to know when a child goes to certain locations. Embodiments additionally provide for a comparison to be made between a current location that is detected by the location sensor 106 and a location of another party according to the notification 130 generated by the other party. If the locations are within a predetermined distance of one another, an additional notification 130 may be generated and sent to the other party alerting them of their proximity.

According to various embodiments, the notification rules 126 that are used may depend upon the subscription level of the user associated with the user device 102. For example, if a user has subscribed to a minimum service plan, then all notifications 130 may be posted to a single public website that is available to anyone with a web browser 136. However, a premium service plan may allow a user access to the notification rule 126 that directs the notification engine 120 to the user profile 128. The user profile may be customizable by the user to direct notifications 130 to any number of parties, using any number of delivery methods at any given time. Each user profile 128 may be linked to a specific device ID 114, enabling the notification engine 120 to locate an applicable user profile 128. It should be understood that the notification rules 126 may alternatively be stored within the user profiles 128 such that the notification engine 120 references the applicable user profile 128 according to the device ID 114 each time event data 129 is received to determine the proper notification process. It should also be appreciated that the notification engine 120 may store notifications 130 within a log in the database 124 when created for tracking and reference purposes.

Figure 2:
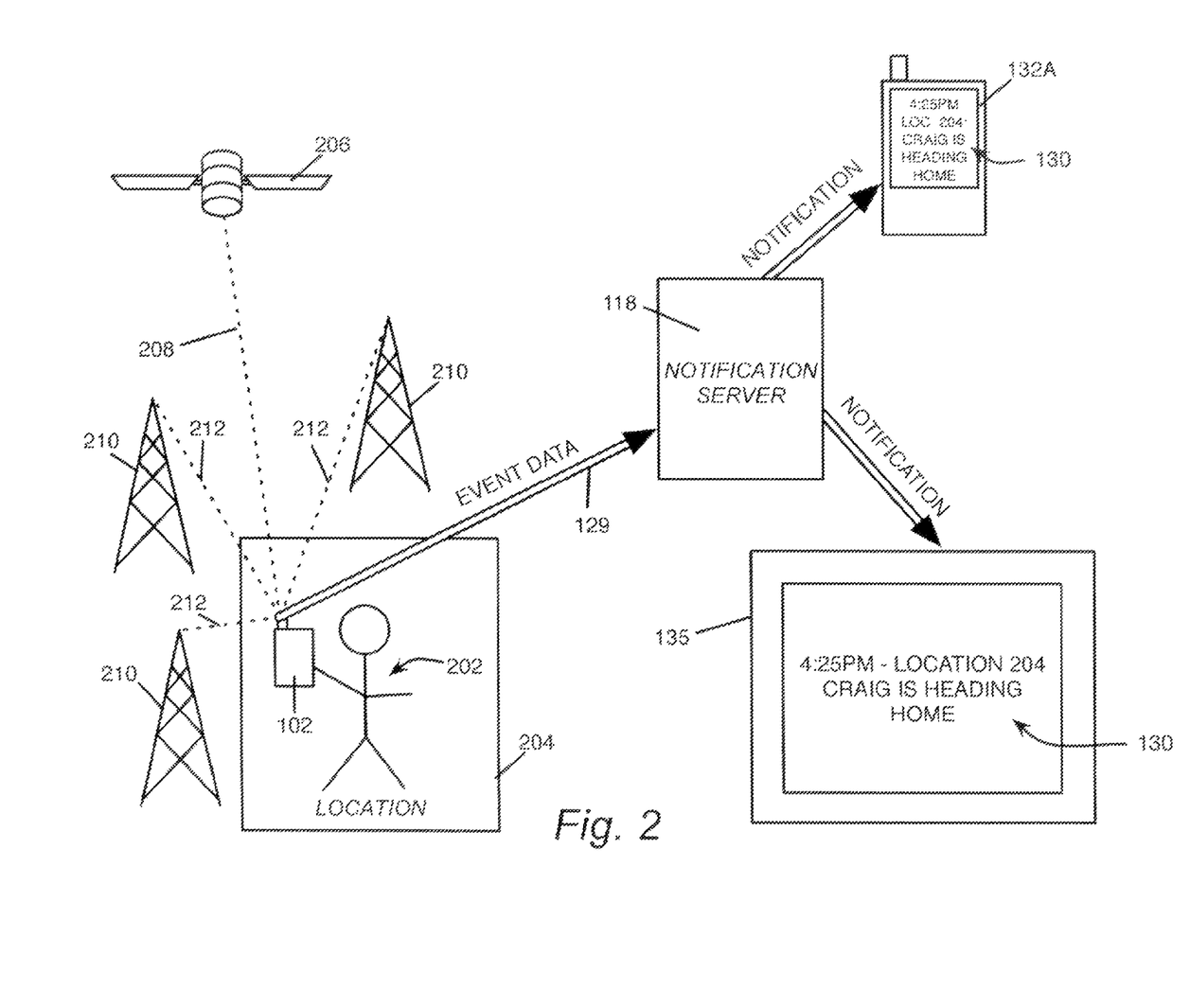
FIG. 2 is a block diagram showing an example of an event and corresponding real-time event notification according to various embodiments presented herein.

Looking now at FIG. 2, an example of an event and corresponding real-time event notification according to various embodiments presented herein will be described. According to the example shown, a user 202 is on the way home and is currently located at location 204. The user 202 would like to initiate the notification 130 to let certain people know that he is on the way home. The notification 130 may be initiated manually by the user 202 or automatically upon detection of the user device 102 within location 204. The user 202 may manually initiate the notification process by pressing a button or series of buttons via a user interface of the user device 102. It should be appreciated that any manner of initiating a communication may be used to initiate the notification process. For example, the user device 102 may also contain voice recognition components that allow the user 202 to create the notification 130 by saying, "notify family, coming home." The "notify family" command would initiate the collection of location data and time stamp, while the "coming home" portion of the statement would be attached to the event data 129 as activity data 116 to be included in the notification 130.

The notification process may additionally be initiated automatically by the processor 110 of the user device 102 upon an indication from the location sensor 106 that the user device 102 is proximate to a location that is programmed to be a trigger of the notification process. For example, the user device 102 may be programmed to create a notification 130 to the user's family every day when the user device 102 is at location 204 within a specific time window. When the location sensor 106 detects that the user device 102 is at a particular landmark between 5 and 7 pm, then the user device 102 will transmit the current location, time, and a pre-programmed message that the user is on the way home to the notification server 118 to create the appropriate notification 130.

It should be understood that the triggering of the notification process, as well as the determination of the activity data 116 to be used in the creation of the notification 130 might depend upon any event that is detectable by the user device 102. The trigger is not limited to a detection of a particular location. For example, if the user device 102 includes a GPS receiver as a location sensor 106, then the notification process may be triggered by a detection that the user device 102 is moving at a velocity higher than a pre-programmed threshold. If the GPS receiver detects, for example, that the user device 102 is traveling at more than 10 miles per hour, then a notification 130 may be posted to a specified website that the corresponding user is currently driving. If the communication device 132 includes a Geographic Information System (GIS), the notification 130 could graphically display the user device 102 on a map showing a precise location.

Returning now to FIG. 2, once the notification process has been initiated, either manually or automatically, then the location of the user device 102 is determined. As stated above, the location detection may occur using any appropriate location determination method. The illustrated example shows two methods for determining the location of the user device 102. The first method is to receive a GPS signal 208 from one or more satellites 206 using a GPS receiver in the user device 102.

The second method involves triangulating the geographic position of the user device 102 using cellular signals 212 between the user device 102 and multiple elements 210 of a cellular network. The location sensor 106 and processor 110 may derive the precise geographic location of the user device 102 and send the location as location data to the notification server 118 for inclusion within the notification 130, or the user device 102 may send any type of location data that may be used by the notification engine 120 in determining the geographic location of the user device 102, including instructions to the notification engine 120 to request the geographic location from a third party or from another network element.

The time that the location was determined or that the location data was generated is stamped for inclusion with the event data 129 to be sent to the notification server 118. Assuming that the user 202 in our example wants to include the message, "coming home" with the notification 130, the user 202 enters the message into the user device 102. As previously discussed, the user 202 may do so by pressing a button or other control that has been pre-programmed with that message, typing the message into the user device 102, or verbally speaking the message. The message is then stored as activity data 116 and is added to the event data 129.

The event data 129, consisting of the device ID 114, the location data, the time stamp, and the activity data 116, is transmitted to the notification server 118 via the network 134. The notification engine 120 generates a notification 130 that includes the location and time of the event and the message from the user 202. It should be appreciated that the information included within the notification 130 may be altered without departing from the scope of the disclosed embodiments. The notification 130 contents may also be amended according to instructions within an applicable notification rule 126 or user profile 128. After retrieving any appropriate notification rule 126 and consulting the user profile 128, the notification engine 120 determines that the notification 130 should be sent via text messaging to the cellular telephone 132A and that the notification 130 should additionally be posted to a family website that is then accessed by a family member and displayed on the display 135 of the personal computer 132B.

Figure 3A:
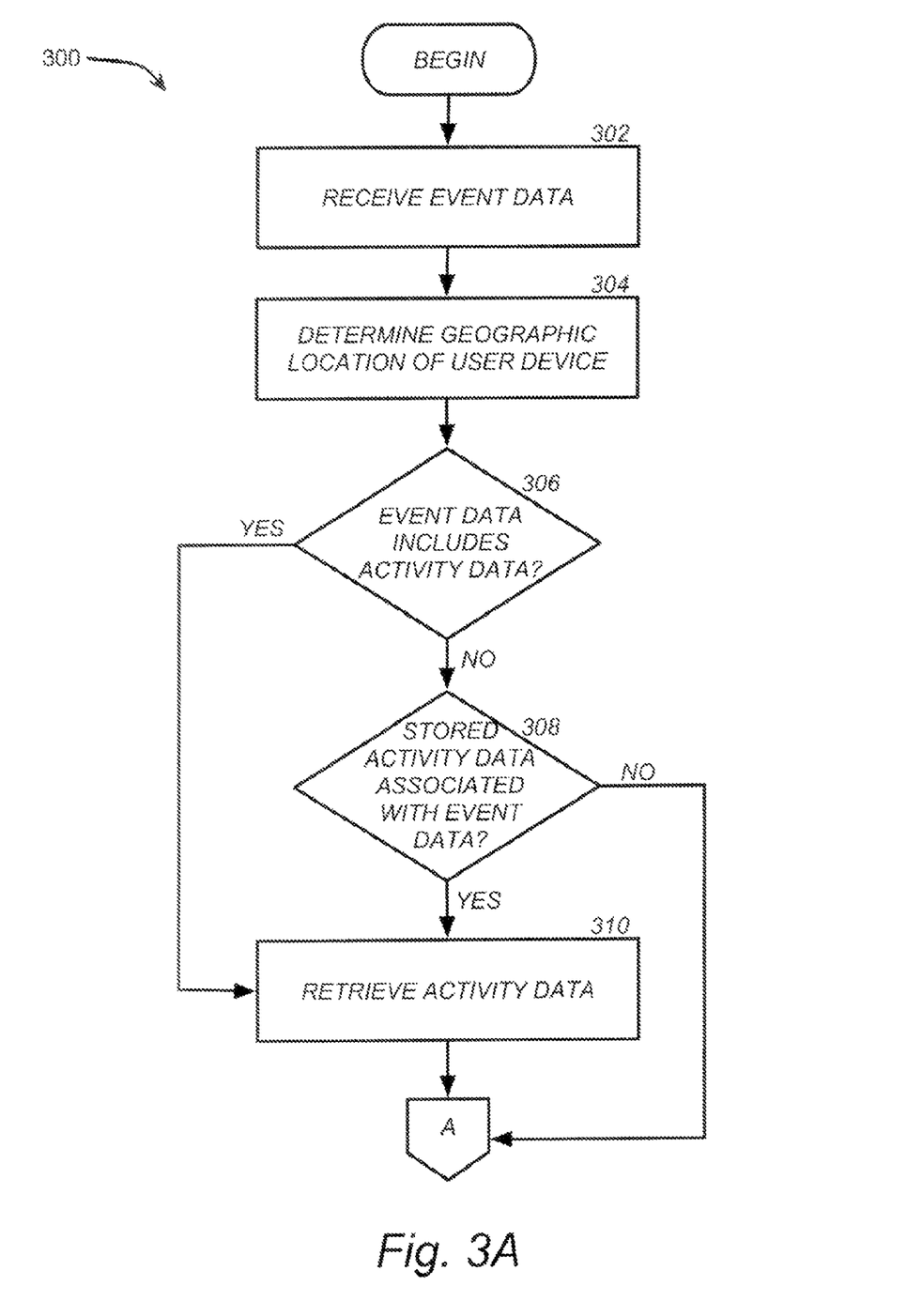
FIGS. 3A and 3B are flow diagrams illustrating a method for providing real-time event notification according to various embodiments presented herein.
Figure 3B:
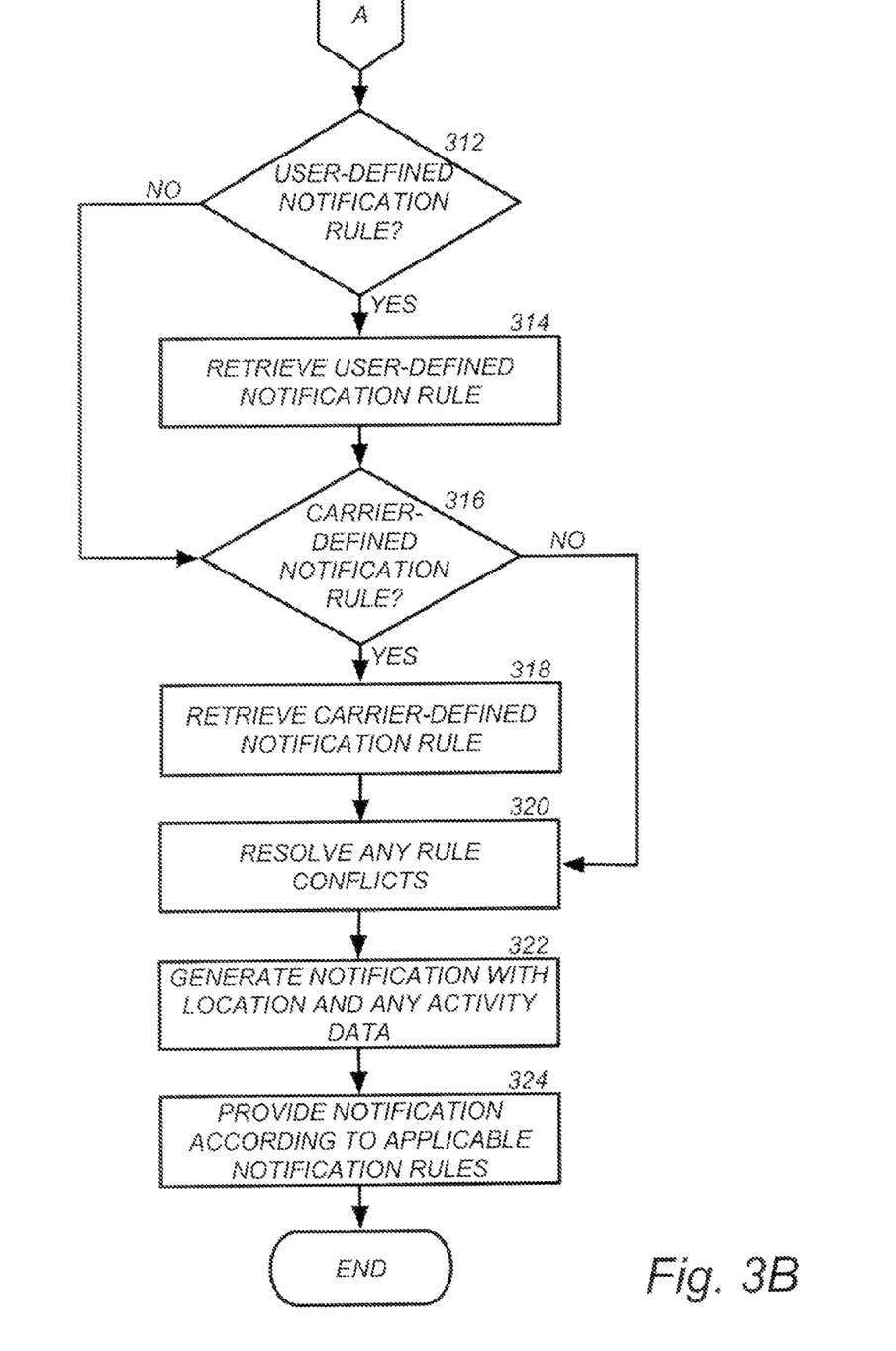

Turning now to FIGS. 3A and 3B, an illustrative routine 300 will be described for providing real-time event notification according to various embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 300 begins at operation 302, where the notification engine 120 receives event data 129 from the user device 102. From operation 302, the routine 300 continues to operation 304, where the notification engine 120 determines the geographic location of the user device 102. This determination may be an extraction of the location from the event data 129, may include calculating the geographic location if the location data included with the event data 129 is not properly formatted for the notification or requires further calculation from raw data detected by the location sensor 106, or may include requesting the geographic location from another network element if instructed to do so by the event data 129 or if no location data is included with the event data 129.

The routine 300 continues from operation 304 to operation 306, where the notification engine 120 determines whether the event data 129 includes activity data 116. If the event data 129 does include activity data 116, then the routine proceeds to operation 310 and continues as described below. However, if at operation 306, the notification engine 120 determines that the event data 129 does not include activity data 116, then the routine 300 continues to operation 308, where the notification engine 120 determines whether there is any stored activity data 116 associated with the event data 129.

As mentioned above, it should be appreciated that activity data 116 may also or alternatively be stored at the notification server 118 or database 124 that corresponds to a particular location, time, key press or series of key presses, combination thereof, or any other data that might be included with the event data 129 from the user device 102. For example, a user might press #2 on his or her cellular phone and then press a button programmed to initiate the notification process. The event data 129 would include data corresponding to the #2 key selection, which could be used by the notification engine 120 to determine from the corresponding user profile 128 that the #2 key corresponds to "stuck in traffic."

Additionally, the event data 129 may contain only location data and a device ID 114, which is used to determine from the appropriate user profile 128 that the location data should be displayed with a specific stored message. If at operation 308, the notification engine 120 determines that there is not any stored activity data 116 associated with the received event data 129, then the routine 300 proceeds to operation 312 and continues as described below. However, if at operation 308, the notification engine 120 determines that there is stored activity data 116 associated with the received event data 129, then the routine 300 continues to operation 310, where the notification engine 120 retrieves the activity data 116.

From operation 310, the routine 300 continues to operation 312, where the notification engine 120 determines whether there is an applicable user-defined notification rule 126 corresponding to the event data 129. If there is not a user-defined notification rule 126, then the routine 300 proceeds to operation 316 and continues as described below. However, if at operation 312, the notification engine 120 determines that there is a user-defined notification rule 126, then the routine 300 continues to operation 314, where the notification engine 120 retrieves the user-defined notification rule 126.

From operation 314, the routine 300 continues to operation 316, where the notification engine 120 determines if there is an applicable carrier-defined notification rule 126. As described above, there may be notification rules 126 that allow for varying levels of customized notification according to a particular subscription level that the user has agreed to with the carrier of the notification service. If the notification engine 120 determines that there is not a carrier-defined notification rule 126, then the routine 300 proceeds to operation 320 and continues as described below. However, if at operation 316, the notification engine 120 determines that there is a carrier-defined notification rule 126, then the routine 300 continues to operation 318, where the notification engine 120 retrieves the carrier-defined notification rule 126.

The routine 300 continues from operation 318 to operation 320, where the notification engine 120 resolves any rule conflicts. For example, there may be a user-defined notification rule 126 that establishes a complex notification process with multiple people to receive notifications using various formats. If the user then enters an amended contract that does not allow for the level of customization formerly allowed, then the carrier-defined notification rule 126 would control the notification process. From operation 320, the routine 300 continues to operation 322, where the notification engine 120 generates the notification 130 containing the geographic location of the user device 102 and any applicable messages or information corresponding to the activity data 116. The routine 300 continues from operation 322 to operation 324, where the notification engine 120 provides the notification 130 according to the applicable notification rules 126 and the routine 300 ends.

Figure 4:
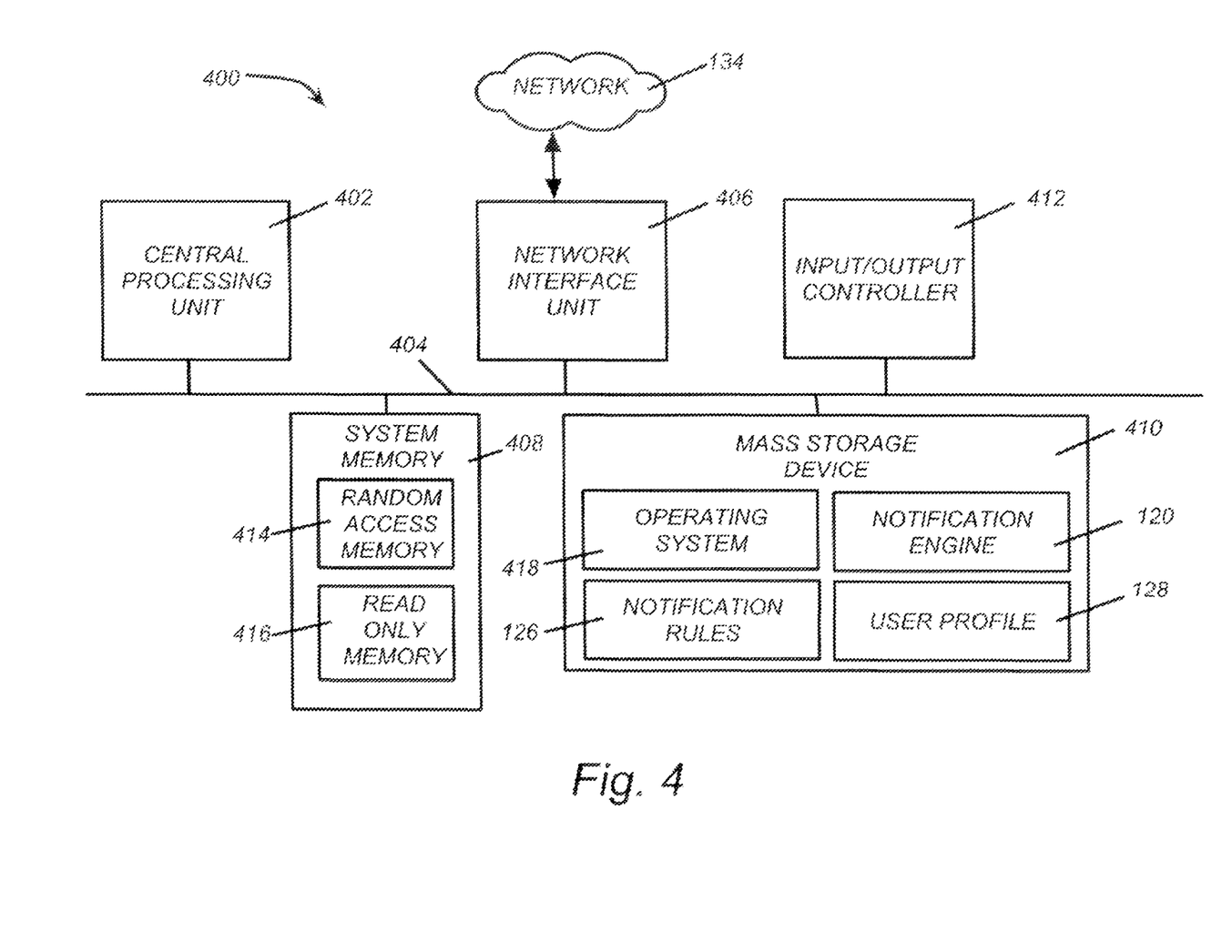
FIG. 4 is a computer architecture diagram showing a computer architecture suitable for implementing the various computer systems described herein.

Referring now to FIG. 4, an illustrative computer architecture for a computer 400 utilized in the various embodiments presented herein will be discussed. The computer architecture shown in FIG. 4 illustrates a conventional desktop, laptop computer, or server computer. Specifically, the computer 400 illustrates the computer architecture associated with the notification server 118, the user device 102, or the communications devices 132. The computer architecture shown in FIG. 4 includes a central processing unit 402 (CPU), a system memory 408, including a random access memory 414 (RAM) and a read-only memory (ROM) 416, and a system bus 404 that couples the memory to the CPU 402. A basic input/output system (BIOS) containing the basic routines that help to transfer information between elements within the computer 400, such as during startup, is stored in the ROM 416. The computer 400 further includes a mass storage device 410 for storing an operating system 418, application programs, and other program modules, which will be described in greater detail below.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through the network 134. As described above with respect to FIG. 1, the network 134 may include a wireless network such as, but not limited to, a WLAN such as a WI-FI network, a WWAN, a WPAN such as BLUETOOTH, a WMAN such a WiMAX network, a cellular network, or a satellite network. Alternatively, the network 134 may be a wired network such as, but not limited to, a wired WAN, a wired LAN such as the Ethernet, a wired PAN, or a wired MAN. The network 134 may include the Internet such that the elements of the real-time event notification system 100 communicate with one another via wireless or wired connections to the Internet.

The computer 400 may connect to the network 134 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including the operating system 418 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that the implementations presented herein may be embodied using a desktop or laptop computer or any other computing devices or systems or combinations thereof.

The mass storage device 410 and RAM 414 may also store one or more program modules. In particular, the mass storage device 410 and the RAM 414 may store the notification engine 120, the notification rules 126, and the user profile 128, as well as any other program modules described above with respect to FIG. 1. Based on the foregoing, it should be appreciated that apparatus, systems, methods, and computer-readable media for providing real-time event notification are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing a notification, the method comprising:
   receiving data associated with a user device, the data comprising location information associated with the user device and identification information associated with the user device;
   determining a geographic location of the user device from the data;
   comparing the geographic location of the user device with a list of locations to determine whether the user device is proximate a location from the list of locations;
   upon determining that the user device is proximate a location from the list of locations, retrieving a message corresponding to the data;
   generating the notification comprising the message and the geographic location; and
   providing the notification according to a notification rule.

2. The method of claim 1, wherein the notification rule comprises a first notification rule indicating a format for providing the notification and a destination for providing the notification.

3. The method of claim 2, wherein the notification rule further comprises a notification rule and wherein the method further comprises:
   resolving a conflict between the first notification rule and the second notification rule;
   determining an applicable notification rule based on a resolution of the conflict; and
   providing the notification according to the applicable notification rule.

4. The method of claim 1, wherein providing the notification according to the notification rule comprises providing the notification in a first format to a first party and in a second format to a second party.

5. The method of claim 1, wherein the message is stored in a user profile associated with the identification information.

6. The method of claim 1, wherein the message corresponds to a current activity associated with a user of the user device.

7. The method of claim 1, wherein the data further comprises a time stamp associated with the location information.

8. A system for providing a notification, the system comprising:
   a memory having computer-executable instructions stored thereon for providing the notification; and
   a processor functionally coupled to the memory, the processor operative to execute the computer-executable instructions which cause the processor to perform a method comprising:
      receiving data associated with a user device, the data comprising location information associated with the user device and identification information associated with the user device,
      determining a geographic location of the user device from the data,
      comparing the geographic location of the user device with a list of locations to determine whether the user device is proximate a location from the list of locations,
      upon determining that the user device is proximate a location from the list of locations, retrieving a message corresponding to the data,
      generating the notification comprising the message and the geographic location, and
      providing the notification according to a notification rule.

9. The system of claim 8, wherein the notification rule comprises a first notification rule indicating a format for providing the notification and a destination for providing the notification.

10. The system of claim 9, wherein the notification rule further comprises a second notification rule and wherein the computer-executable instructions cause the processor to perform a method further comprising:
    resolving a conflict between the first notification rule and the second notification rule;
    determining an applicable notification rule based on a resolution of the conflict; and
    providing the notification according to the applicable notification rule.

11. The system of claim 8, wherein providing the notification according to the notification rule comprises providing the notification in a first format to a first party and in a second format to a second party.

12. The system of claim 8, wherein the message is stored in a user profile stored in the memory, the user profile associated with the identification information.

13. The system of claim 8, wherein the message corresponds to a current activity associated with a user of the user device.

14. The system of claim 8, wherein the data further comprises a time stamp associated with the location information.

15. A computer-readable medium having computer-executable instructions stored thereon which, when executed by a computer, cause the computer to perform a method comprising:
    receiving data associated with a user device, the data comprising location information associated with the user device and identification information associated with the user device;
    determining a geographic location of the user device from the data;
    comparing the geographic location of the user device with a list of locations to determine whether the user device is proximate a location from the list of locations;
    upon determining that the user device is proximate a location from the list of locations, retrieving a message corresponding to the data;
    generating a notification comprising the message and the geographic location; and
    providing the notification according to a notification rule.

16. The computer-readable medium of claim 15, wherein the notification rule comprises a first notification rule indicating a format for providing the notification and a destination for providing the notification.

17. The computer-readable medium of claim 16, wherein the notification rule further comprises a second notification rule and wherein the computer performs a method further comprising:
    resolving a conflict between the first notification rule and the second notification rule;
    determining an applicable notification rule based on a resolution of the conflict; and
    providing the notification according to the applicable notification rule.

18. The computer-readable medium of claim 15, wherein providing the notification according to the notification rule comprises providing the notification in a first format to a first party and in a second format to a second party.

19. The computer-readable medium of claim 15, wherein the message is stored in a user profile associated with the identification information.

20. The computer-readable medium of claim 15, wherein the message corresponds to a current activity associated with a user of the user device.

* * * * *